UNITED STATES PATENT OFFICE.

CHARLES A. KRAUS, OF NEWTON HIGHLANDS, MASSACHUSETTS.

COMPOSITION OF VITREOUS MATTER.

974,801.  Specification of Letters Patent.  Patented Nov. 8, 1910.

No Drawing.  Application filed August 27, 1909. Serial No. 514,858.

*To all whom it may concern:*

Be it known that I, CHARLES A. KRAUS, a citizen of the United States, and resident of Newton Highlands, in the county of Middlesex and State of Massachusetts, have invented new and useful Improvements in Composition of Vitreous Matter, of which the following is a specification.

My invention consists in a new composition of matter, of which a conspicuous utility is in the formation of gas-tight thermally or electrically insulating joints between metal and glass or other insulating material, or between two metal members.
This composition of matter is adapted to be applied especially to metals, such as iron or steel, and will be so applied in a fused or viscous condition under heat.

The vitreous substance or composition which is to serve as a coating or lining for metal, or which is to establish efficient hermetical union between two surfaces, especially when one at least is a metal surface, or which is to unite two metallic members, must be susceptible of application in a molten, that is to say, a fluid or viscous condition; and it should possess in appreciable measure the following properties, to wit:—First. It should be capable in the fluid or semi-fluid condition of dissolving the oxid of a metal to which it is applied, so as thus to cleanse the metallic surfaces for the purpose of intimate and perfect contact with the vitreous composition. Second. It should freely wet the surface to which it is applied. Third. It should have a co-efficient of thermal expansion which approximates to that of the substance to which it is applied, in order that, on cooling or when in use the united members are subjected to fluctuations of temperature, the vitreous composition may preserve its own integrity and the intimacy of union with the member to which it is applied. Fourth. It should be mechanically strong, tough and preferably adhesive in respect to the materials to which it is applied. Fifth. It should fuse at moderate temperatures, not only for the sake of ready application but also so as to reduce as far as possible in the process of application that temperature interval during which strains are likely to be established. Sixth. In case the composition is to be used to join together two members which have decidedly different thermal co-efficient of expansion, as a rule this composition to act as an efficient intermediary between such members should have a thermal co-efficient of expansion intermediate between the co-efficients of the members joined.

A composition of matter which constitutes a good example of my invention and which possesses the above recited properties in an unique degree, is constituted as follows:— soda glass, 45%, borax, 45%, ferric oxid, 10%. These ingredients are fused together so as to form a homogeneous composition. The borax furnishes mechanical strength to the composition, renders it readily fusible at moderate temperatures, and contributes in a marked degree to the capacity of the composition to cleanse and wet a metallic surface when applied thereto in a fused condition. The ferric oxid contributes also to the toughness and ready fusibility of the composition, and renders it strongly adhesive to iron and kindred metals. Soda glass, as is well-known, is composed chiefly of sodium and calcium silicate. Presumably the former ingredient is the more essential for the purposes hereinabove indicated, and therefore the calcium silicate might well be replaced by some other silicate capable of forming a glass with the sodium silicate without seriously modifying the properties of the composition in respect to the peculiar utilities contemplated for it.

Iron belongs to a group of closely kindred elements ordinarily known as the iron group, of which the other metals are cobalt, nickel, chromium and manganese. The elements of this group manifest striking similarity in physical and chemical properties, both in their elementary state and in their compounds; they are adjacent to each other in the elementary series and have atomic weights lying in the narrow range between 52 and 59. A significant index of the close kinship between these metallic elements, is that they are notably magnetic in character, exceeding all other elements in this respect. It is well-known that members of the iron group on account of their similarity may replace one another, not only in many chemical processes, but also in compositions of matter, such as steel, without radically altering the character of the process or the qualities of the material. Thus, as might be expected, salts or the oxids of the other members of this closely related group will when employed in the above described vitreous composition instead of ferric oxid lend to the composition properties similar to those conferred by ferric oxid.

By reason of its properties above alluded to, this vitreous fusible homogeneous composition is adapted for many useful purposes. By its aid a stout iron wire may be effectively sealed through a glass tube or bulb, a result never before accomplished so far as I am informed.

The proportions of the ingredients of this new composition of matter can of course, be varied from the precise relative quantities above specified, and should be varied to suit the exigencies of different though related uses. For instance, if the vitreous compound is to be employed simply as a lining or coating for an iron or steel body, the formula given above is, I believe, to be preferred, whereas if the composition is to be used to join an iron or steel member to a member composed of ordinary glass, an effective composition may contain 65% of soda glass, 22% of borax and 13% of ferric oxid. Obviously in making such a composition of matter, a mixture of ferric borate and sodium oxid will produce as a result a homogeneous composition the same as with ferric oxid and sodium borate. Such reciprocal inversion of the ingredient compounds are indifferent so far as concerns the resultant composition.

I am aware that mixtures of soda glass and borax have been used for glazing iron; but these compositions lack both the strength and adhesiveness possessed by my new composition of matter, which is characterized by an ingredient salt of a metal of the iron group. I am also aware that some glasses or enamels have been made which contain small amounts of iron, cobalt or manganese, either as an impurity or as coloring matter; but in no case so far as I know have the proportions of such ingredients been sufficient appreciably to affect the mechanical properties of the glass or enamel, nor have they ever been capable, so far as I have known, of exercising the functional capacities which my new composition of matter possesses and which may be exploited for the purposes above suggested.

What I claim and desire to secure by Letters Patent is:—

1. A vitreous homogeneous composition composed chiefly of sodium boro-silicate and containing further the oxid of a metal of the iron group in proportions sufficient to manifest in the composition when fused a superficial intimacy with iron or kindred metal.

2. A vitreous homogeneous composition composed chiefly of sodium boro-silicate and containing further the oxid of a metal having an atomic weight between 52 and 59 in proportions sufficient to manifest in the composition when fused a superficial intimacy with iron or kindred metal.

3. The composition of soda glass, borax and ferric oxid, the last in proportions sufficient to manifest in the composition when fused a superficial intimacy with iron or kindred metal.

4. A vitreous homogeneous composition whereof the chief constituents are sodium boro-silicate and an oxid of a metal of the iron group.

5. A vitreous homogeneous composition whereof the chief constitutents are sodium boro-silicate and ferric oxid.

6. A vitreous composition whereof the chief ingredients are glass, borax and ferric oxid, the last in proportions not less than 6% by weight.

7. A vitreous homogeneous composition whereof the chief ingredients are soda glass, borax and ferric oxid, the last in proportions not less than 6% by weight.

8. A vitreous homogeneous composition composed of glass, borax and ferric oxid in substantially the proportions herein specified.

Signed by me at Boston, Massachusetts, this 23d day of August 1909.

CHARLES A. KRAUS.

Witnesses:
ROY D. MAILEY,
GILBERT N. LEWIS.